(12) United States Patent
Dietrich

(10) Patent No.: US 8,991,145 B2
(45) Date of Patent: Mar. 31, 2015

(54) CROP LIFTER WITH RELEASABLE TIPS

(76) Inventor: Dave Dietrich, Assiniboia (CA)

( * ) Notice: Subject to any disclaimer, the term of this patent is extended or adjusted under 35 U.S.C. 154(b) by 293 days.

(21) Appl. No.: 13/296,510

(22) Filed: Nov. 15, 2011

(65) Prior Publication Data

US 2013/0118140 A1    May 16, 2013

(51) Int. Cl.
*A01D 34/00* (2006.01)
*A01D 65/02* (2006.01)

(52) U.S. Cl.
CPC ..................... *A01D 65/02* (2013.01)
USPC ........................................... 56/312

(58) Field of Classification Search
USPC .................. 56/312–314, 119, 17.3
See application file for complete search history.

(56) References Cited

U.S. PATENT DOCUMENTS

| | | | | |
|---|---|---|---|---|
| 700,029 A | | 5/1902 | Gatermann | |
| 723,084 A | * | 3/1903 | Vollborn | 56/312 |
| 723,880 A | * | 3/1903 | Koch | 56/312 |
| 791,022 A | | 5/1905 | Gaterman | |
| 843,164 A | * | 2/1907 | McCutchan | 56/313 |
| 1,204,441 A | * | 11/1916 | Holland-Letz | 56/313 |
| 1,942,286 A | * | 1/1934 | Harkness | 56/312 |
| 2,099,471 A | * | 11/1937 | Edgington | 56/312 |
| 2,141,299 A | * | 12/1938 | Hume et al. | 56/313 |
| 2,141,300 A | * | 12/1938 | Hume et al. | 56/313 |
| 2,290,404 A | * | 7/1942 | Cardinal | 56/312 |
| 2,294,646 A | * | 9/1942 | Young | 56/313 |
| 2,394,838 A | * | 2/1946 | Beltz | 56/312 |
| 2,551,258 A | * | 5/1951 | Frye | 56/312 |
| 2,734,332 A | | 2/1956 | Fisher | |
| 2,892,298 A | | 6/1959 | Chaney | |
| 2,960,814 A | | 11/1960 | Babcock | |
| 3,834,139 A | * | 9/1974 | Schumacher et al. | 56/313 |
| 4,120,138 A | | 10/1978 | Schumacher, II et al. | |
| 5,906,091 A | * | 5/1999 | Gemar | 56/119 |
| 7,306,410 B2 | * | 12/2007 | Borschert et al. | 408/144 |
| 2007/0028581 A1 | * | 2/2007 | Dietrich | 56/307 |

FOREIGN PATENT DOCUMENTS

CA    407654    9/1942

* cited by examiner

*Primary Examiner* — Thomas B Will
*Assistant Examiner* — Joan D Misa
(74) *Attorney, Agent, or Firm* — Nixon & Vanderhye P.C.

(57) ABSTRACT

A crop lifter apparatus has a base member adapted to be attached to a cutting header guard finger about a lifter pivot axis. A plurality of lifter tips with different configurations are releasably attachable to the base member at a mounting position such that the attached lifter tip extends forward from the base member. A bias element is operative to exert a bias force on the base member urging a front portion of the base member forward of the lifter pivot axis to pivot downward about the lifter pivot axis, and the bias force urges the base member to bear against a stop. The tips can be configured to suit various conditions of soils and crops.

14 Claims, 2 Drawing Sheets

CROP LIFTER WITH RELEASABLE TIPS

This invention is in the field of cutting headers such as are used in agriculture for cutting crops for harvest and the like, and in particular with crop lifters mounted on such headers to increase crop gathering and retention in the harvesting machine.

BACKGROUND

For various reasons crops sometimes are lying so close to the ground that it is difficult to cut them with a conventional harvest header. Some crops are inherently short, while others may be taller, but are prone to fall down when they reach maturity. Heavy rain or hail can also cause crop to be lying close to the ground at harvest time.

Typically the knife on cutting headers comprises a knife bar extending along the front lower edge of the header, with a plurality of triangular knife sections attached to the bar such that the apex of the triangle extends forward from the bar. The exposed side edges of the knife sections are sharpened. Guards are attached to the front lower edge of the header and serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

A conventional knife is a few inches above the ground when the header is in its lowest position, such that very short or downed crop material will pass under the knife and be lost. Many different kinds of "crop lifters", as they have come to be known, have been developed over the last century and more. Typically these crop lifters are attached to the header and/or the forward extending point of the guard finger, and provide an arm of various designs that rides along the ground ahead of the knife. A lifting finger extends at a shallow angle from the front of the arm back and over the knife. As the header moves down the field, the arm rides along the ground and under the downed crop stalks, which then are lifted and pass over the lifting finger to the knife, where they are cut and continue moving onto the header from where they can be passed to the harvester, swather table, or the like.

U.S. Pat. Nos. 700,029 and 791,022 to Gatermann, U.S. Pat. No. 2,734,332 to Fisher, U.S. Pat. No. 2,892,298 to Chaney, U.S. Pat. No. 2,960,814 to Babcock, and Canadian Patent Number 407,654 to Young disclose such a crop lifter that is pivotally attached to the header so as to be able to move up and down to follow the ground. The Babcock and Fisher devices float on the ground, while the others are biased toward the ground by springs. U.S. Pat. No. 4,120,138 to Schumacher illustrates a crop lifter that is fixed to the header instead of pivoting, but is made of spring steel so that same may move up and down to follow the ground.

The front portion of a pivotally attached crop lifter like Gatermann rides along on the ground and so typically the lifters have an up-turned ski-type front end so that the lifter rides along the ground but does not dig into the ground. These lifters have various configurations of length, width, shape, and so forth with some shapes better suited for some conditions than others. The lifters also change shape as contact with the ground wears material away from the lifter, and when the shape becomes unsuitable for the purpose, the lifter must be changed.

SUMMARY OF THE INVENTION

It is an object of the present invention to provide a crop lifter apparatus for cutting headers on harvesting equipment that overcomes problems in the prior art.

In a first embodiment the present invention provides a crop lifter apparatus for attachment to a cutting header, the cutting header having a knife and guards attached to a lower front edge thereof with guard fingers of the guards extending forward from the header. The apparatus comprises a base member adapted to be attached to a guard finger about a lifter pivot axis oriented substantially horizontally and perpendicular to an operating travel direction of the header. A first lifter tip with a first configuration is releasably attachable to the base member at a mounting position such that the first lifter tip extends forward from the base member, and a second lifter tip with a second configuration different from the first configuration is releasably attachable to the base member at the mounting position such that the second lifter tip extends forward from the base member. A bias element is operative to exert a bias force on the base member urging a front portion of the base member forward of the lifter pivot axis to pivot downward about the lifter pivot axis, and the bias force urges the base member to bear against a stop.

In a second embodiment the present invention provides a cutting header for a harvesting implement. The cutting header comprises a knife and guards attached to a lower front edge of the cutting header, wherein guard fingers of the guards extend forward from the header. A base member is attached to a guard finger about a lifter pivot axis oriented substantially horizontally and perpendicular to an operating travel direction of the header. A first lifter tip with a first configuration is releasably attachable to the base member at a mounting position such that the first lifter tip extends forward from the base member, and a second lifter tip with a second configuration different from the first configuration is releasably attachable to the base member at the mounting position such that the second lifter tip extends forward from the base member. A bias element is operative to exert a bias force on the base member urging a front portion of the base member forward of the lifter pivot axis to pivot downward about the lifter pivot axis, and wherein the bias force urges the base member to bear against a stop.

The present invention thus provides a lifter with interchangeable tips that can be changed to suit crop and soil conditions, or replaced when worn out. The tips can also be readily subjected to hardening procedures to reduce wear without adversely affecting the main base member of the apparatus.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
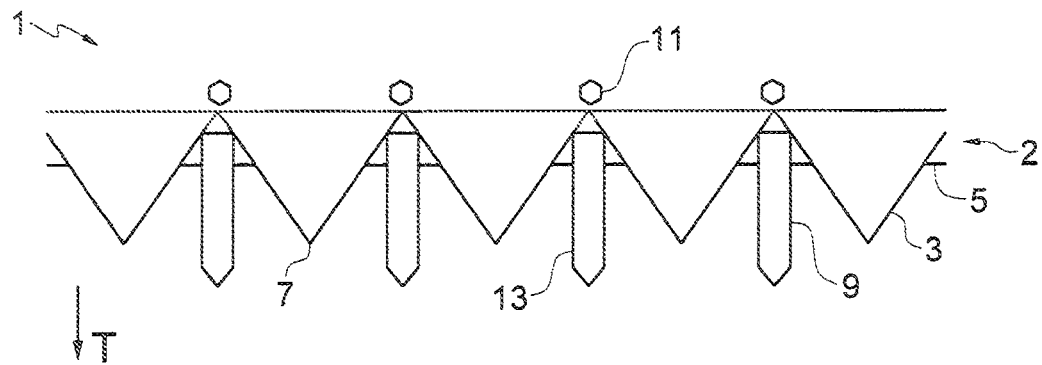
FIG. 1 is a schematic top view of a knife of typical cutting header of the prior art.

FIG. 1 schematically illustrates a typical cutting header 1 of the prior art comprising a knife extending along the front lower edge of the header, which is moved along a field in an operating travel direction T. The knife 2 comprises a plurality of triangular knife sections 3 attached to a knife bar 5 such that the apex 7 of the triangle extends forward from the bar 5. Guards 9 are attached to the front lower edge of the header 1 with guard bolts 11 and serve to protect the knife sections 3 from breakage when contacting stones and like obstructions, and to provide a shearing edge for the knife sections 3. The guards 9 comprise pointed guard fingers 13 extending forward from the header.

Figure 2:
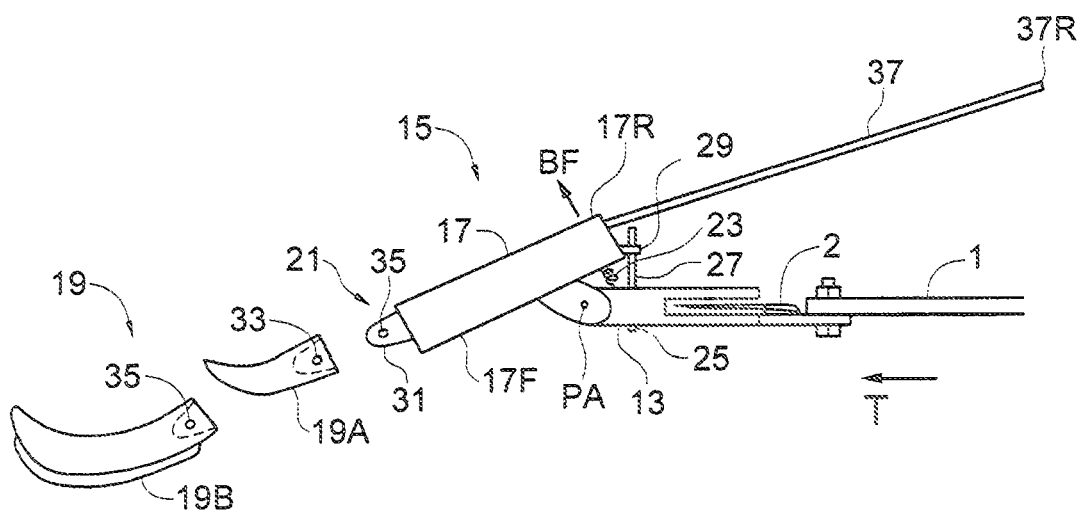
FIG. 2 is a schematic side view of an embodiment of a crop lifter apparatus of the present invention.

An embodiment of a crop lifter apparatus 15 of the present invention for attachment to the cutting header 1 is schematically illustrated in FIG. 2. The apparatus 15 comprises a base member 17 adapted to be attached to a guard finger 13 about a lifter pivot axis PA oriented substantially horizontally and perpendicular to an operating travel direction T of the header. In the illustrated apparatus 15, the base member 17 is mounted to the guard finger 13 simply by a bolt, pin, or the like through corresponding holes in the base member 17 and guard finger 13 which provides the lifter pivot axis PA.

A first lifter tip 19A with a first configuration is releasably attachable to the base member 17 at a mounting position 21 such that the first lifter tip 19A extends forward from the base member 17. A second lifter tip 19B with a second configuration different from the first configuration is also releasably attachable to the base member 17 at the same mounting position 21 such that the second lifter tip 19B extends forward from the base member 17. When the header is lowered and working the tips 19 will ride along on the ground moving up and down about the lifter pivot axis PA.

The configurations of the first and second lifter tips 19A, 19B can be selected to suit the soil and/or crop conditions that will be encountered during use, and the tips can be quickly interchanged to suit changing conditions. For example where the soil is hard and dry and the crop is lying close to the ground first lifter tip 19A can be narrow with only a short upturned front ski shape to avoid digging into the ground. Where the soil is soft, such as sandier soils, a longer upturned front ski shape can be provided, and a wider bottom skid plate could be provided as well. Only two interchangeable lifter tips 19 are illustrated to demonstrate the interchangeability of the tips 19 however it is contemplated that any number of different tips 19 with different configurations for different conditions could be provided.

The separation of the base member 17 from the lifter tips 19 also conveniently allows the tips to be heat treated or otherwise hardened to reduce wear. Such hardening treatments typically cause the hardened metal to become brittle and subject to breakage. The longer base member 17 can thus be made out of malleable steel which is more suitable for resisting breakage, while the wearing tips can be hardened and then attached.

A bias element, illustrated as compression spring 23, is operative to exert an upward bias force BF on a rear portion 17R of the base member 17 which urges the front portion 17F of the base member 17, located forward of the lifter pivot axis PA, to pivot downward about the lifter pivot axis PA. The bias force BF urges the base member against a stop 25 that bears against the bottom of the guard finger 13 and so prevents downward movement of the front portion 17F of the base member 17 beyond a desired position. In the illustrated apparatus 15, the stop 25 is adjustable by moving the stop arm 27 up and down in the stop bracket 29. The slope of a lifter tip 19 attached to the front of the base member 17 when the base member 17 bears against the stop 25 can thereby be adjusted to suit soil and crop conditions. The slope of the lifter tips 19 when the base member bears against the stop 25 essentially dictates the angle at which the tips 19 will first contact the ground when the header is lowered to a working position, or when the header rises over a lump and then comes back down, and the tips 19 then pivot upward against the bias force BF about the lifter pivot axis PA in reaction to the force of contacting the ground.

In the illustrated apparatus 15, the mounting point 21 is at the front end of the base member 17 where a lug 31 is configured to slide into a recess 33 defined in rear ends of the lifter tips 19. Corresponding lateral apertures 35 are defined through rear ends of the lifter tips 19 and the lug 31 at the front end of the base member 17. The corresponding lateral apertures 35 are aligned when one of the lifter tips 19 is attached to the front end of the base member 17 and a fastener, such as a screw, roll, pin, bolt, or the like extends through the corresponding lateral apertures 35 to attach the tip.

Thus the lifter tips 19 can be quickly changed to suit soil and/or crop conditions. The illustrated apparatus 15 also provides a removable lifter finger 37 releasably attached to the base member 17 in a socket or the like defined by the base member 17. The lifter finger 37 extends rearward at an upward slope from a rear portion 17R of the base member 17 to a rear end of the lifter finger 37R located above and rearward of the knife 2. In some crop conditions, such as where it is sometimes required to reverse the direction of travel such a rearward extending lifter finger 37 can be caught in the crop and cause damage and so it may then be advantageous to remove same.

Figure 3:
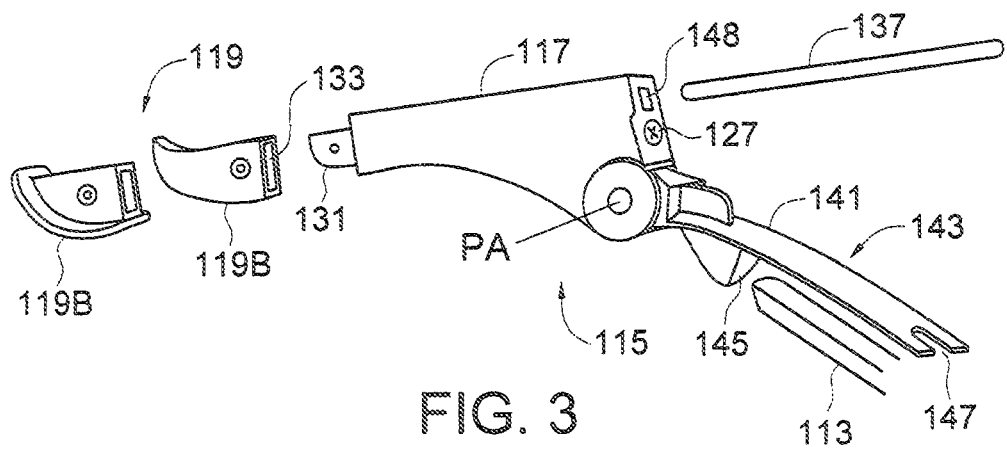
FIG. 3 is a schematic rear perspective view of an alternate embodiment of a crop lifter apparatus of the present invention.
Figure 4:
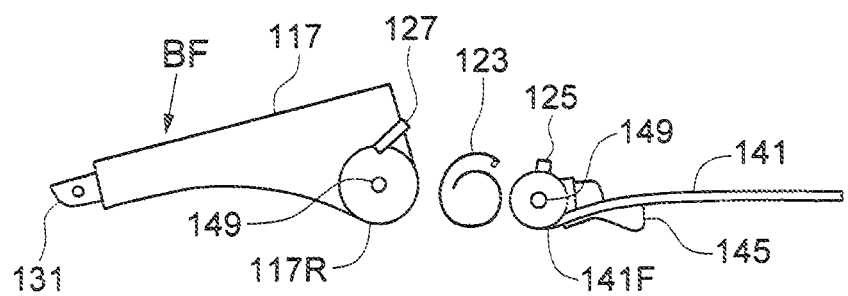
FIG. 4 is a schematic exploded side view of the embodiment of FIG. 3.

FIGS. 3 and 4 schematically illustrate an embodiment of a crop lifter apparatus 115 of the present invention where the base member 117 is adapted to be attached to a guard finger 113 about the lifter pivot axis PA by a guard finger bracket 141 that is adapted to be attached to the guard finger 113 by an engagement mechanism 143 that has a socket 145 into which the end of the guard finger 113 is inserted and has a slot 147 at the rear end that engages a guard bolt attaching the guard to the header such as is known in the prior art.

The base member 117 is then pivotally attached to the guard finger bracket 141 about the lifter pivot axis PA. As schematically illustrated in the exploded side view of FIG. 4, the front end 141F of the guard finger bracket 141 is inserted into the rear end 117R of the base member 117 and a torsion spring 123 is connected to or engages the guard finger bracket 141 and the base member 117. A pin or bolt is inserted into corresponding holes 149 in the finger bracket 141 and base member 117. The torsion spring 123 provides the bias element and exerts the downward bias force BF between the guard finger bracket 141 and the base member 117 about the lifter pivot axis PA urging the front end of the base member 117 downward. The first and second lifter tips 119A, 119B are releasably attachable to the mounting position at a forward end of the base member 117 as described above with lug 131 inserted into recess 133 in the rear end of each lifter tip 119. The illustrated apparatus 115 also provides a removable lifter finger 137 releasably attached to the base member 117 in a socket 148 defined by the base member 117. The lifter finger 137 extends rearward at an upward slope from the base member 117 to a rear end of the lifter finger located above and rearward of the knife when attached to the guard finger 113.

A screw 127 in the base member bears against a stop 125 on the guard finger bracket 141 to provide the required stop, and turning the screw 127 adjusts the effective position of the stop 125 to adjust the slope of the lifter tip 119 attached to the front end of the base member 117.

Figure 5:
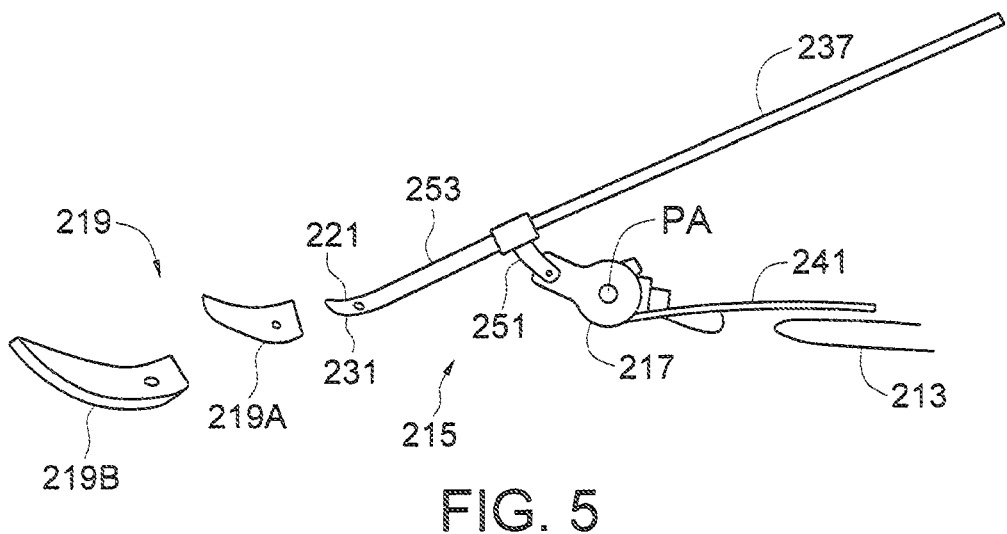
FIG. 5 is a schematic side view of a further alternate embodiment of a crop lifter apparatus of the present invention.

FIG. 5 schematically illustrate a further embodiment of a crop lifter apparatus 215 of the present invention where the base member 217 is adapted to be attached to a guard finger 213 about the lifter pivot axis PA by a guard finger bracket 241 adapted to be attached to the guard finger 213 as described above for the apparatus 115 of FIGS. 3 and 4. A lifter finger bracket 251 is attached to a front portion of the base member 217, and a lifter finger 253 is engaged in the lifter finger bracket 251 such that the lifter finger 253 extends forward from the lifter finger bracket 251.

As above, first and second lifter tips 219A, 219B are releasably attachable to the mounting position 221 which in this apparatus 215 is located at a forward end of the lifter finger 253 where a lug 231, provided by the end of the lifter finger 253, is inserted into a recess in the rear end of the tips 219. In this apparatus 215 as illustrated, the lifter finger 253 includes a rear portion 237 that extends rearward at an upward angle from the lifter finger bracket 251 to a rear end of the lifter finger 253 located above and rearward of the knife when the apparatus 215 is attached to the guard finger 213.

Thus the present invention provides a lifter with interchangeable tips that can be changed to suit crop and soil conditions. The tips can also be readily hardened to reduce wear without adversely affecting the malleability of the main base member of the apparatus. Further the tips can be replaced when excessively worn from contact with the ground.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A crop lifter apparatus for attachment to a cutting header, the cutting header having a knife and guards attached to a lower front edge thereof with guard fingers of the guards extending forward from the header, the apparatus comprising:
a base member adapted to be attached to a guard finger about a lifter pivot axis oriented substantially horizontally and perpendicular to an operating travel direction of the header;
a lug extending forward from a forward end of the base member;
a first lifter tip with a first configuration releasably attachable to the base member by inserting the lug into a recess in a rear end of the first lifter tip such that a whole of the first lifter tip extends forward from the base member in a fixed position relative to the base member;
a second lifter tip with a second configuration different from the first configuration and releasably attachable to the base member by inserting the lug into a recess in a rear end of the second lifter tip such that a whole of the second lifter tip extends forward from the base member in a fixed position relative to the base member;
corresponding lateral apertures through rear ends of the first and second lifter tips and the lug, and wherein the corresponding lateral apertures are aligned when one of the first and second lifter tips is attached to the lug, and comprising a fastener extending through the corresponding lateral apertures; and
a bias element operative to exert a bias force on the base member urging a front portion of the base member forward of the lifter pivot axis to pivot downward about the lifter pivot axis, and wherein the bias force urges the base member to bear against a stop.

2. The apparatus of claim 1 comprising a guard finger bracket adapted to be attached to a guard finger, and wherein the base member is pivotally attached to the guard finger bracket about the lifter pivot axis.

3. The apparatus of claim 2 wherein the bias element comprises a torsion spring exerting the downward bias force between the guard finger bracket and the base member about the lifter pivot axis.

4. The apparatus of claim 1 comprising a lifter finger releasably attached to the base member such that the lifter finger extends rearward at an upward slope from a rear portion of the base member to a rear end of the lifter finger located above and rearward of the knife.

5. The apparatus of claim 1 comprising a lifter finger bracket attached to a front portion of the base member, and a lifter finger engaged in the lifter finger bracket such that the lifter finger extends forward from the lifter finger bracket, and wherein the lug is attached at a forward end of the lifter finger.

6. The apparatus of claim 5 wherein the lifter finger extends rearward at an upward angle from the lifter finger bracket to a rear end of the lifter finger located above and rearward of the knife.

7. The apparatus of claim 1 wherein the stop is adjustable such that a slope of the first and second lifter tips when the base member bears against the stop can be adjusted.

8. A cutting header for a harvesting implement, the cutting header comprising:
a knife and guards attached to a lower front edge of the cutting header, wherein guard fingers of the guards extend forward from the header;
a base member attached to a guard finger about a lifter pivot axis oriented substantially horizontally and perpendicular to an operating travel direction of the header;
a lug extending forward from a forward end of the base member
a first lifter tip with a first configuration releasably attachable to the base member by inserting the lug into a recess in a rear end of the first lifter tip position such that a whole of the first lifter tip extends forward from the base member in a fixed position relative to the base member;
a second lifter tip with a second configuration different from the first configuration and releasably attachable to the base member by inserting the lug into a recess in a rear end of the second lifter tip such that a whole of the second lifter tip extends forward from the base member in a fixed position relative to the base member;
corresponding lateral apertures through rear ends of the first and second lifter tips and the lug, and wherein the corresponding lateral apertures are aligned when one of the first and second lifter tips is attached to the lug, and comprising a fastener extending corresponding lateral apertures; and
a bias element operative to exert a bias force on the base member urging a front portion of the base member forward of the lifter pivot axis to pivot downward about the lifter pivot axis, and wherein the bias force urges the base member to bear against a stop.

9. The header of claim 8 comprising a guard finger bracket attached to the guard finger, and wherein the base member is pivotally attached to the guard finger bracket about the lifter pivot axis.

10. The header of claim 9 wherein the bias element comprises a torsion spring exerting the downward bias force between the guard finger bracket and the base member about the lifter pivot axis.

11. The header of claim 8 comprising a lifter finger releasably attached to the base member such that the lifter finger extends rearward at an upward slope from a rear portion of the base member to a rear end of the lifter finger located above and rearward of the knife.

12. The header of claim 8 comprising a lifter finger bracket attached to a front portion of the base member, and a lifter finger engaged in the lifter finger bracket such that the lifter finger extends forward from the lifter finger bracket, and wherein the lug is attached at a forward end of the lifter finger.

13. The header of claim 12 wherein the lifter finger extends rearward at an upward angle from the lifter finger bracket to a rear end of the lifter finger located above and rearward of the knife.

14. The header of claim 8 wherein the stop is adjustable such that a slope of the first and second lifter tips when the base member bears against the stop can be adjusted.

* * * * *